(12) United States Patent
Tsai et al.

(10) Patent No.: US 9,432,899 B2
(45) Date of Patent: Aug. 30, 2016

(54) COMMUNICATIONS SYSTEM, USER EQUIPMENT, MOBILITY MANAGEMENT ENTITY AND METHOD THEREOF OF TRANSIENT HANDOVER FOR PERFORMING PACKET OFFLOADING

(71) Applicant: Industrial Technology Research Institute, Hsinchu (TW)

(72) Inventors: Tzu-Jane Tsai, Zhubei (TW); Jiann-Ching Guey, Hsinchu (TW); Chao-Yuan Hsu, New Taipei (JP)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 198 days.

(21) Appl. No.: 14/139,487

(22) Filed: Dec. 23, 2013

(65) Prior Publication Data

US 2014/0177600 A1    Jun. 26, 2014

Related U.S. Application Data

(60) Provisional application No. 61/745,973, filed on Dec. 26, 2012.

(30) Foreign Application Priority Data

Sep. 16, 2013   (TW) .............................. 102133440 A

(51) Int. Cl.
*H04W 36/22* (2009.01)
*H04W 36/38* (2009.01)

(52) U.S. Cl.
CPC ........... *H04W 36/22* (2013.01); *H04W 36/385* (2013.01)

(58) Field of Classification Search
CPC ................................................ H04W 36/0022
See application file for complete search history.

(56) References Cited

U.S. PATENT DOCUMENTS

2005/0147068 A1*  7/2005  Rajkotia ........... H04W 36/0061
                                                      370/338
2005/0157676 A1   7/2005  Kwak et al.
(Continued)

FOREIGN PATENT DOCUMENTS

| TW | M292848 U | 6/2006 |
|---|---|---|
| WO | WO 00/62572 A1 | 10/2000 |

(Continued)

OTHER PUBLICATIONS

A. A. Atayero et al., "Interworking Architectures in Heterogeneous Wireless Networks: An Algorithmic Overview", International Journal of Computer Applications, vol. 48, No. 9, pp. 38-44, Jun. 2012.

(Continued)

*Primary Examiner* — John Blanton
(74) *Attorney, Agent, or Firm* — Birch, Stewart, Kolasch & Birch, LLP

(57) ABSTRACT

A method of a transient handover for performing packet offloading is disclosed. The method is used in a cellular network and includes: finding at least one qualified user equipment according to a determining method, and transmitting a handover-transient request to the qualified UE; finding and transmitting an access request to a wireless local area network after the UE receives the handover-transient request; transmitting a handover-transient ACK to a mobility management entity when the qualified user equipment accesses the wireless local area network; and releasing a bearer resource of the qualified user equipment when the MME receives the handover-transient ACK, retaining bearer information of the qualified user equipment, and handing over the qualified user equipment from the cellular network to the wireless local area network.

34 Claims, 10 Drawing Sheets

(56) References Cited

U.S. PATENT DOCUMENTS

| | | |
|---|---|---|
| 2007/0232311 A1 | 10/2007 | Kuhn et al. |
| 2009/0285183 A1* | 11/2009 | Wu .................. H04W 72/0433 370/331 |
| 2010/0323700 A1 | 12/2010 | Bachmann et al. |
| 2011/0090870 A1 | 4/2011 | Ronneke et al. |
| 2011/0090873 A1* | 4/2011 | Lee .................. H04W 36/0066 370/332 |
| 2011/0110350 A1 | 5/2011 | Lu et al. |
| 2011/0274083 A1 | 11/2011 | Bazzo et al. |
| 2011/0274087 A1 | 11/2011 | Liang et al. |
| 2011/0310850 A1* | 12/2011 | Klingenbrunn ....... H04W 36/30 370/332 |
| 2012/0094674 A1 | 4/2012 | Wu |
| 2012/0122458 A1 | 5/2012 | Jokinen et al. |
| 2012/0135733 A1 | 5/2012 | Cormier et al. |
| 2012/0269167 A1* | 10/2012 | Velev ............... H04W 36/0011 370/331 |
| 2012/0294287 A1* | 11/2012 | Jeong ..................... H04L 5/001 370/331 |
| 2012/0300712 A1* | 11/2012 | Hakola ............... H04W 74/008 370/329 |
| 2014/0092742 A1* | 4/2014 | Chou .................. H04W 76/046 370/325 |

FOREIGN PATENT DOCUMENTS

| | | |
|---|---|---|
| WO | WO 2008/066928 A2 | 6/2008 |
| WO | WO 2010/117227 A2 | 10/2010 |

OTHER PUBLICATIONS

E. Bulut et al., "WiFi Access Point Deployment for Efficient Mobile Data Offloading", Proc. ACM Workshop PINGEN at Mobicom'12, Aug. 26, 2012.

G. Bollano et al., "Enhanced Android Connection Manager—An Application-based Solution to manage Mobile Data Traffic", IEICE 2012.

L. Hu et al., "How much can Wi-Fi offload?—A Large-scale Dense-urban Indoor Deployment Study", IEEE, VTC Spring, Oct. 2012.

Qi-Piing Yang et al., "Mobility Prediction and Load Balancing Based Adaptive Handovers for LTE Systems", International Journal on Computer Science and Engineering (IJCSE), vol. 4, No. 4, Apr. 2012.

Y. Go et al., "A Disruption-tolerant Transmission Protocol for Practical Mobile Data Offloading", MobiOpp'12, Mar. 15-16, 2012.

Taiwanese Office Action for corresponding Taiwanese Application No. 102133440 dated Feb. 11, 2015.

European Search Report dated Mar. 31, 2014. 13199470.9-1854.

* cited by examiner

COMMUNICATIONS SYSTEM, USER EQUIPMENT, MOBILITY MANAGEMENT ENTITY AND METHOD THEREOF OF TRANSIENT HANDOVER FOR PERFORMING PACKET OFFLOADING

CROSS REFERENCE TO RELATED APPLICATIONS

The present application is based on, claims the benefit of U.S. Provisional Application No. 61/745,973, filed on Dec. 26, 2012, and claims priority from, Taiwan (International) Application Serial Number 102133440, filed on Sep. 16, 2013, the disclosure of which is hereby incorporated by reference herein in its entirety.

TECHNICAL FIELD

The present disclosure relates to a communications system, user equipment, mobility management entity and method thereof of a transient handover for performing packet offloading.

BACKGROUND

Due to the explosive growth of mobile network traffic and signaling, mobile operators are in need of carrier-grade wireless local area network (WLAN) deployment to instantly offload mobile data traffic, as proposed by a well-known market research company, Infonetics Research. The mobile operators analyzed the mobile data traffic of the user equipment, and found that the main flows occur in hot spots and indoors at a certain time. The data type in the future will also be video and audio streams. Many companies such as Alcatel-Lucent, Ericsson, Nokia Siemens, etc., put carrier-grade wireless local area networks into small-cell product blueprints. The wireless local area network vendors also actively develop related technologies, such as Hotspot 2.0, hoping for a place in the offloading market.

Currently, when the UE is used practically, the UE moves with the user. Therefore, the UE may switch between different networks to maintain communication quality, such as, a handover from the cellular network to a wireless local area network. However, in this event, all the bearers (radio bearers, S1 bearers and S5 bearers) of the UE in the 3GPP access network are deleted and the mobility state of the UE is transferred to DEREGISTERED. Deleted means that the resources reserved for the EPS bearers are released (where applicable) and the context information of the bearers are deleted in the UE, base station and MME.

However, when the UE is handed over from the wireless local area network to the cellular network, the UE needs to restart a handover attachment procedure. It may take a lot of time to execute the handover attachment procedure for handling handover messages. Therefore, solving the network congestion and simplifying the handover procedure in multi-radio access technology (multi-RAT) are still urgent problems.

SUMMARY

A detailed description is given in the following embodiments with reference to the accompanying drawings.

A communications system, user equipment, mobility management entity and method thereof of a transient handover for performing packet offloading are provided.

In one exemplary embodiment, the disclosure is directed to a method of a transient handover for performing packet offloading, used in a communications system, wherein the communications system is used in a cellular network, the method comprising: finding, by a mobility management entity (MME), at least one qualified user equipment (UE) executing an application from UEs according to a determining method, and transmitting a handover-transient request to the qualified UE; finding and transmitting, by the qualified UE, an access request to a wireless local area network after receiving the handover-transient request; accessing, by the qualified UE, the wireless local area network, and transmitting a handover-transient ACK to the MME; and releasing, by the MME, a bearer resource of the qualified UE, retaining bearer information of the qualified UE, and handing over the qualified UE from the cellular network to the wireless local area network after receiving the handover-transient ACK.

In one exemplary embodiment, the disclosure is directed to a method of a transient handover for performing packet offloading, used in a mobility management entity (MME) of a cellular network, the method comprising: finding at least one qualified user equipment (UE) from UEs according to a determining method and transmitting a handover-transient request to the qualified UE; and releasing a bearer resource of the qualified UE, retaining bearer information of the qualified UE, and handing over the qualified UE from the cellular network to the wireless local area network after receiving a handover-transient ACK transmitted from the qualified UE.

In one exemplary embodiment, the disclosure is directed to a method of a transient handover for performing packet offloading, used in a user equipment (UE) executing an application, wherein the UE attaches to a cellular network, the method comprising: receiving a handover-transient request from a mobility management entity (MME) in the cellular network; finding whether there is a wireless local area network; transmitting an access request to the wireless local area network when finding the wireless local area network; transmitting a handover-transient ACK to the MME when accessing the wireless local area network; and handed over from the cellular network to the wireless local area network by the MME.

In one exemplary embodiment, the disclosure is directed to a communications system of a transient handover for performing packet offloading. The communications system is used in a cellular network and comprises at least one qualified user equipment (UE) and a mobility management entity (MME). The qualified UE attaches to the cellular network and executes an application. The mobility management entity (MME) is coupled to the qualified UE, configured to find the qualified UE from UEs according to a determining method and transmit a handover-transient request to the qualified UE, wherein the qualified UE finds and transmits an access request to a wireless local area network after receiving the handover-transient request; the qualified UE transmits a handover-transient ACK to the MME when accessing the wireless local area network; the MME releases a bearer resource of the qualified UE, retains bearer information of the qualified UE and hands over the qualified UE from the cellular network to the wireless local area network after receiving the handover-transient ACK.

In one exemplary embodiment, the disclosure is directed to a mobility management entity (MME). The MME is used in a cellular network and at least comprises a control circuit, a processor installed in the control circuit, a memory installed in the control circuit and coupled to the processor, wherein the processor is configured to execute a program code stored in memory to execute a transient handover for performing packet offloading by: finding at least one qualified user equipment (UE) from UEs according to a determining method and transmitting a handover-transient request to the qualified UE; and releasing a bearer resource of the qualified UE, retaining bearer information of the qualified UE, and handing over the qualified UE from the cellular network to the wireless local area network after receiving a handover-transient ACK transmitted from the qualified UE.

In one exemplary embodiment, the disclosure is directed to a user equipment (UE) The UE is used to execute an application and attached to a cellular network, and comprises a control circuit, a processor installed in the control circuit, a memory installed in the control circuit and coupled to the processor, wherein the processor is configured to execute a program code stored in memory to execute a transient handover for performing packet offloading by: receiving a handover-transient request from a mobility management entity (MME) in the cellular network; finding whether there is a wireless local area network; transmitting an access request to the wireless local area network when finding the wireless local area network; transmitting a handover-transient ACK to the MME when accessing the wireless local area network; and handed over from the cellular network to the wireless local area network by the MME.

A detailed description is given in the following embodiments with reference to the accompanying drawings.

DRAWINGS

The present disclosure can be more fully understood by reading the subsequent detailed description and examples with references made to the accompanying drawings, wherein.

DETAILED DESCRIPTION

Figure 1:
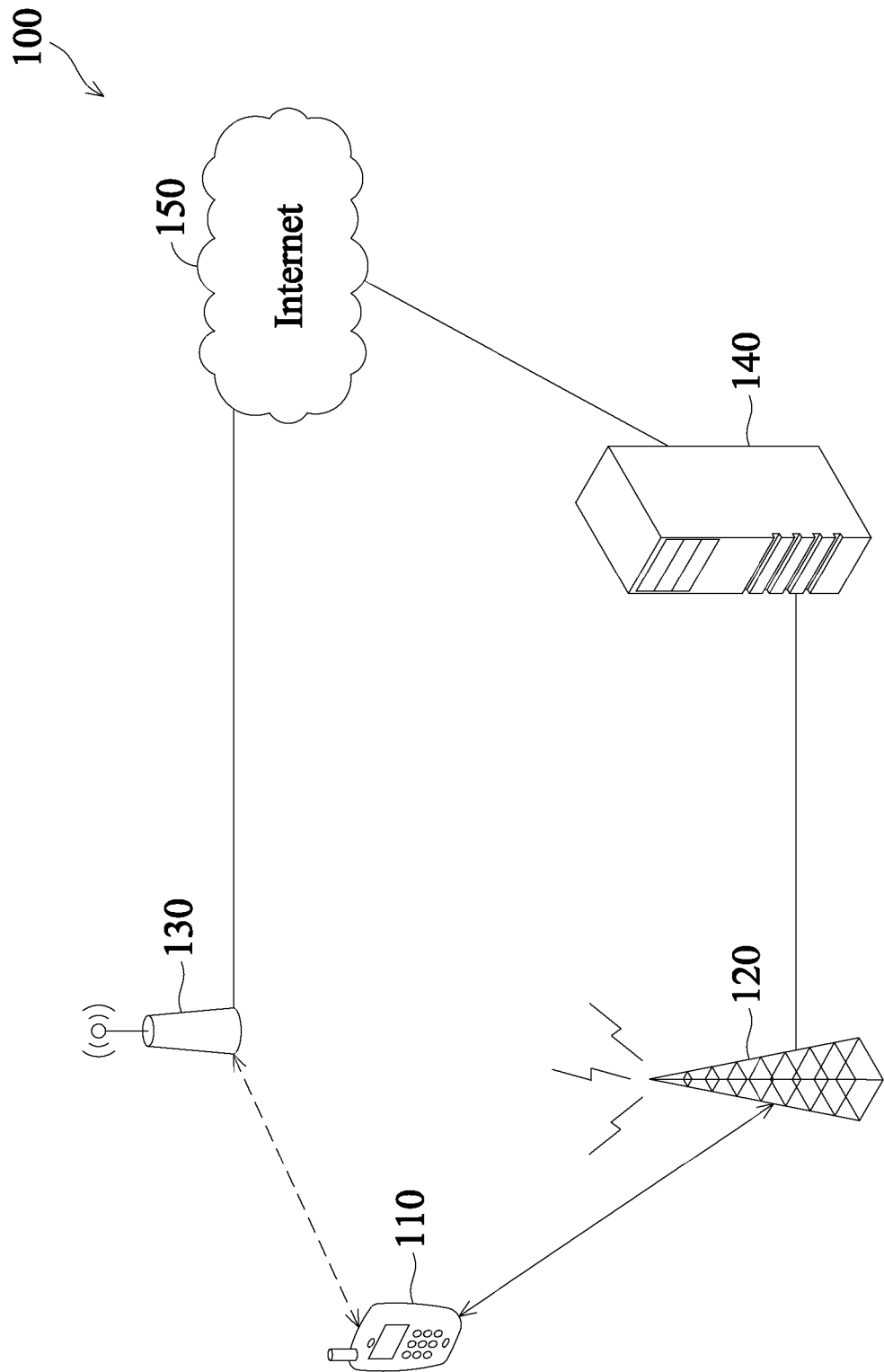
FIG. 1 is a schematic diagram illustrating a multi radio access network system according to an embodiment of the present disclosure.

Several exemplary embodiments of the application are described with reference to FIGS. 1 through 10, which generally relate to a transient handover for performing packet offloading. It is to be understood that the following disclosure provides various different embodiments as examples for implementing different features of the application. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems, and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP Long Term Evolution (LTE), LTE-Advanced (LTE-A) and other standards (e.g., 3GPP Releases 8, 9, 10 and/or 11). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing communications systems and methods herein, a wireless communication device may alternatively be referred to as a mobile station, a User Equipment (UE), an access terminal, a subscriber station, a mobile terminal, a remote station, a user terminal, a terminal, a subscriber unit, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a User Equipment (UE). However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an evolved or enhanced Node B (eNB), a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote a wireless communication device and/or a base station.

FIG. 1 is a schematic diagram illustrating a multi radio access network system 100 according to an embodiment of the present disclosure. The multi radio access network system 100 at least comprises a user equipment (UE) 110, a base station 120, a wireless local area network (WLAN) access point 130, a mobility management entity (MME) 140 and Internet 150.

The UE 110 may be an electronic device having network connection capability. For example, personal computers, notebooks, tablets, smart terminal devices and other electronic devices which can be connected to a wireless network. It should be noted that the UE can be configured with one or more wireless interfaces, but based on energy conservation, only one wireless interface can be operated at the same time.

When the UE 110 attaches to a cellular network, the UE 110 is connected to the base station 120. The base station 120 may connect the UE 110 to the network 150 by the MME 140. However, when the load flow of the cellular network is overloaded, the MME 140 finds at least one qualified UE from UEs 110 according to a determining method, and transmits a handover transient request to the qualified UE.

In an embodiment, the determining method is for finding the qualified UE by the MME 140 according to one or more than one factor, wherein the factors comprise: whether the radio resource of a base station that the UEs belong to is lower than a first threshold; whether a mobility of the UEs is lower than a second threshold; whether the UEs are in a power efficient mode; and whether the traffic type of the UEs is non-real time (NRT).

Table 1 shows the order of importance of the factors according to an embodiment of the present disclosure.

TABLE 1

| | Factor | | | |
|---|---|---|---|---|
| | Radio Resource of Base Station | Mobility of UE | Power Mode of UE | Traffic Type of UE ... |
| Importance | 1 | 2 | 3 | 4 ... |

As shown in Table 1, the MME 140 may find the qualified UE in order according to the importance of the factors. For example, the MME 140 finds a first group of UEs that the radio resource of the base station that the first group of UEs belong to is lower than a first threshold according to the factor whose order value is 1, referred to as Group I. Then, the MME 140 finds a second group of UEs whose mobility is lower than a second threshold from the UEs in Group I according to the factor whose order value is 2, referred to as Group II. Next, the MME 140 finds a third group of UEs which are in a power efficient mode from the UEs in Group II according to the factor whose order value is 3, referred to as Group III. The MME 140 finds a fourth group of UEs whose traffic type is non-real time from the UEs in Group III according to the factor whose order value is 4, referred to as Group IV. In the embodiment, the UEs in Group IV are the qualified UEs.

In another embodiment, each factor may have a respective weighting factor. The MME 140 may find the UE which has the highest weight as the qualified UE from all the UEs according to the weighting factor of each factor. Table 2 shows the weighting factors of the factors according to an embodiment of the present disclosure.

TABLE 2

| | Factor | | | |
|---|---|---|---|---|
| | Radio Resource of Base Station | Mobility of UE | Power Mode of UE | Traffic Type of UE ... |
| Weighting Factor | 0.4 | 0.3 | 0.2 | 0.1 ... |

It should be noted that the number of factors, the order of importance and the weighting factors described above are not limited in the embodiments and the figures shown in this disclosure. In addition, the MME 140 further can adjust the determining method to analyze the characteristics of all the UE in detail.

When receiving a handover transient request, the qualified UE finds whether there is a wireless local area network. When finding the wireless local area network, the qualified UE transmits an access request to the wireless local area network. When accessing the wireless local area network, the qualified UE transmits a handover-transient ACK to the MME 140. When the qualified UE does not find the wireless local area network, the qualified UE transmits a handover-transient NACK to the MME 140 to re-detect whether the load flow of the cellular network is overloaded.

After receiving the handover-transient ACK transmitted from the qualified UE, the MME 140 updates a state of the qualified UE in non-access stratum (NAS) to an evolved packet system mobility management transient state (EMM-TRANSIENT State) to retain bearer information of the qualified UE, wherein the bearer information at least comprises a packet data network gateway identifier (P-GW ID), a serving gateway identifier (S-GW ID) and a tunnel identifier (Tunnel ID). Finally, the MME 140 releases the bearer resource of the qualified UE, and hands over the qualified UE from the cellular network to the wireless local area network.

In one embodiment, after the qualified UE executing an application is handed over from the cellular network to the wireless local area network, the qualified UE detects whether the wireless local area network satisfies quality-of-service (Qos) of the application. When the wireless local area network satisfies the Qos and the application is finished, the qualified UE transmits an attachment request (ATTACH REQ) to the MME 140. After receiving the ATTACH REQ transmitted from the qualified UE, the MME 140 transfers the qualified UE to an evolved packet system mobility management registered state (EMM-REGISTERED state). It should be noted that when the wireless local area network does not satisfy the Qos of the application and the application is finished, the qualified UE still transmits the attachment request (ATTACH REQ) to the MME 140, wherein the ATTACH REQ comprises a Request Type field. When the Request Type field indicates a handover procedure, (namely, the wireless local area network may not provide a good connection quality to the UE), the MME 140 transfers the qualified UE to the EMM-REGISTERED state and re-establishes a cellular data path to handover the qualified UE from the wireless local area network to the cellular network.

In another embodiment, after the qualified UE is handed over from the cellular network to the wireless local area network, the MME 140 transfers the qualified UE to an evolved packet system mobility management deregistered state (EMM-DEREGISTERED state) when not receiving the handover-transient ACK transmitted from the qualified UE and a timer of the MME 140 expired.

Figure 2:
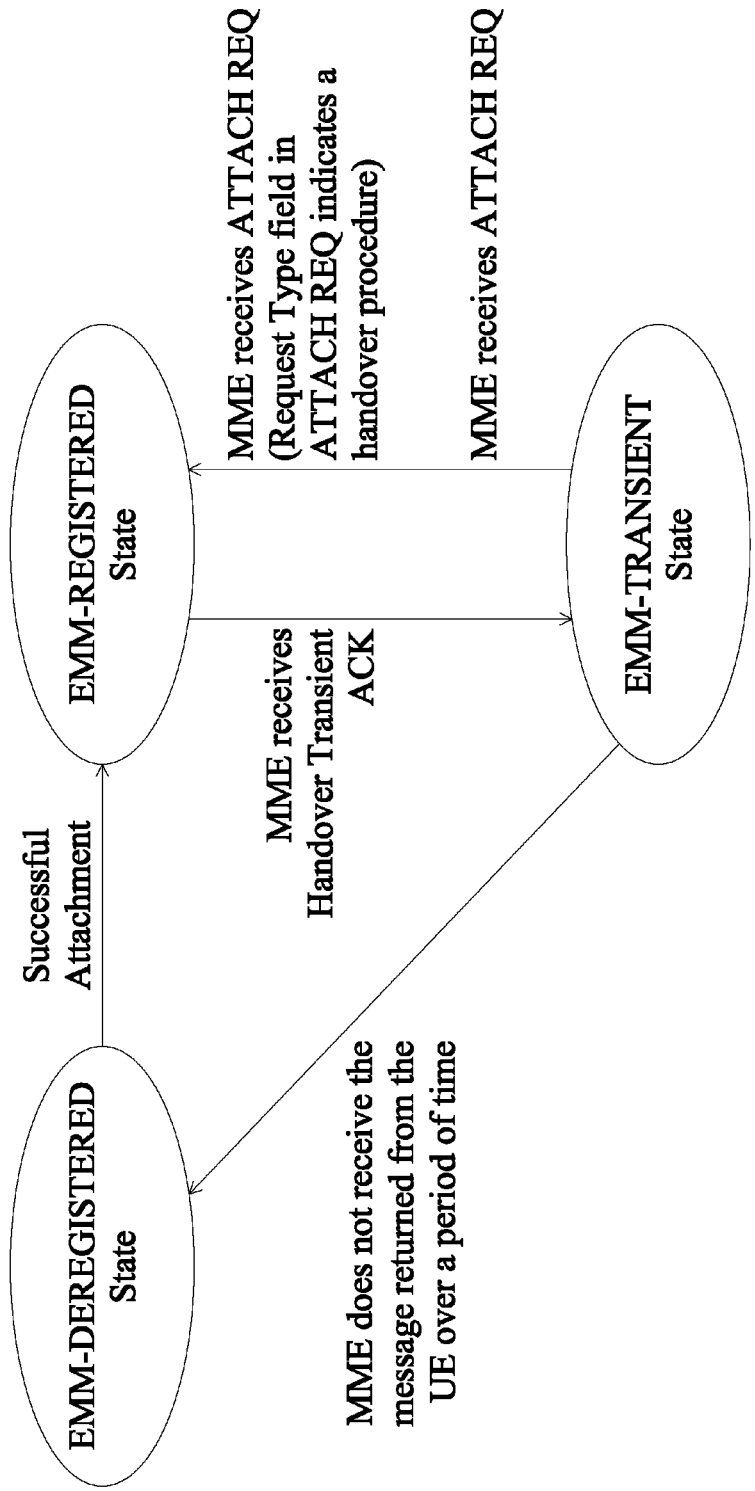
FIG. 2 is a schematic diagram illustrating the transfer of different states comprising an evolved packet system mobility management transient state (EMM-TRANSIENT state), an evolved packet system mobility management registered state (EMM-REGISTERED state) and an evolved packet system mobility management deregistered state (EMM-DEREGISTERED state)

FIG. 2 is a schematic diagram illustrating the transfer of different states comprising an evolved packet system mobility management transient state (EMM-TRANSIENT state), an evolved packet system mobility management registered state (EMM-REGISTERED state) and an evolved packet system mobility management deregistered state (EMM-DEREGISTERED state). Two evolved packet system mobility management states are defined in the 3rd Generation Partnership Project specification: the EMM-REGISTERED state and the EMM-DEREGISTERED state. In the present disclosure, the EMM-TRANSIENT state is further defined to release the bearer resource of the UE.

When the UE is in the EMM-DEREGISTERED state, the MME does not have the bearer information of the UE. As a result, the UE does not attach to the cellular network.

After the UE finishes the attachment procedure, the MME transfers the UE from the EMM-DEREGISTERED state to the EMM-REGISTERED state. When the UE is in the EMM-REGISTERED state, the MME may have the bearer information of the UE. When the UE is handed over to the wireless local area network (namely, the MME receives the handover-transient ACK transmitted from the UE) because the cellular network is overloaded, the MME transfers the UE from the EMM-REGISTERED state to the EMM-TRANSIENT state.

When the UE is in the EMM-TRANSIENT state, the MME releases the bearer resource of the UE and retains the bearer information of the UE. In addition, there are two cases of transferring the UE to the EMM-REGISTERED state. One is that the UE requests to be handed over to the cellular network for connection when the wireless local area network connection quality is bad. Therefore, the UE may transmit the ATTACH REQ to the MME, wherein a Request Type field in the ATTACH REQ indicates a handover procedure. Another case is that the UE may also transmit the ATTACH REQ to the MME to request to be transferred to the cellular network for connection when the wireless local area network connection quality is stable and the connection service is finished successfully. In addition, when the MME does not receive the message returned from the UE over a period of time, the MME actively transfers the UE from the EMM-TRANSIENT state to the EMM-DEREGISTERED state.

Figure 3:
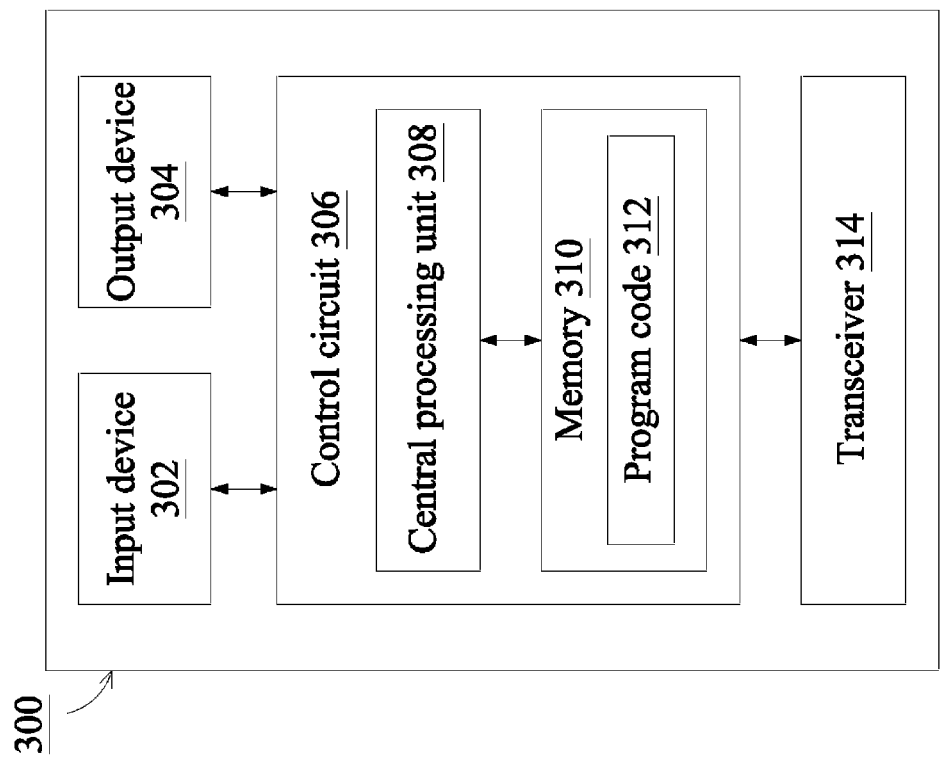
FIG. 3 shows an alternative simplified functional block diagram of a communication device according to one embodiment of the present disclosure.

Next, turning to FIG. 3, FIG. 3 shows an alternative simplified functional block diagram of a communication device 300 according to one embodiment of the present disclosure. As shown in FIG. 3, the communications device 300 in a wireless communications system can be utilized for realizing the UE 110 and the MME 140 in FIG. 1, and the communications device is preferably used in the LTE system, the LTE-A system or other system which is approximate to the two systems described above. The communications device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling the operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, deliver received signals to the control circuit 306, and output signals generated by the control circuit 306 wirelessly. In another embodiment, the MME may further comprise a timer (not shown in FIG. 3), used to count time to determine whether the MME has received the message returned by the UE.

Figure 4:
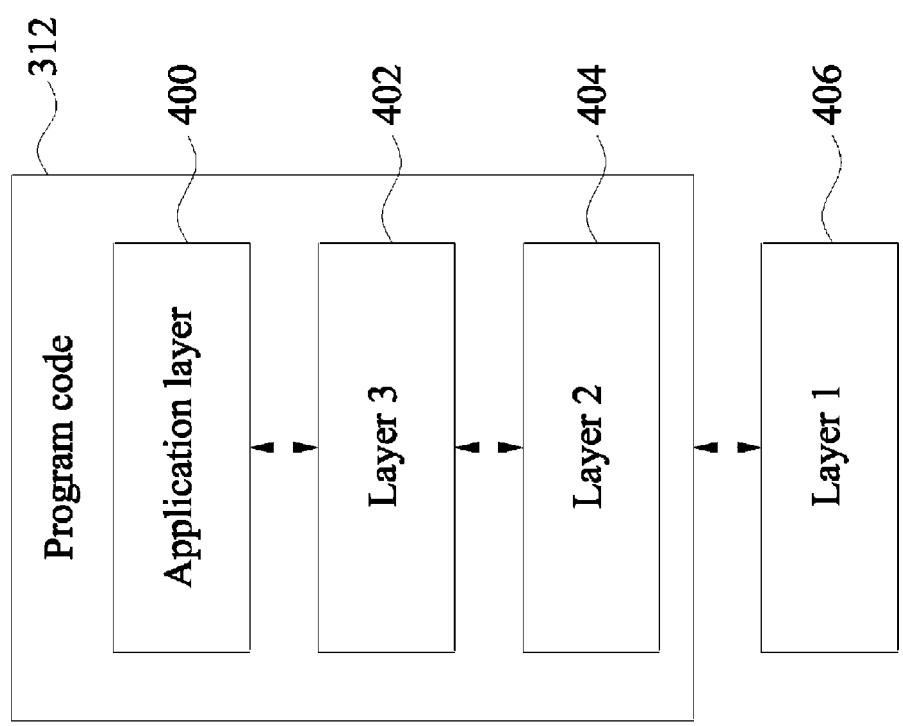
FIG. 4 is a simplified block diagram of the program code shown in FIG. 3 in accordance with one embodiment of the disclosure.

FIG. 4 is a simplified block diagram of the program code 312 shown in FIG. 3 in accordance with one embodiment of the disclosure. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

Figure 5:
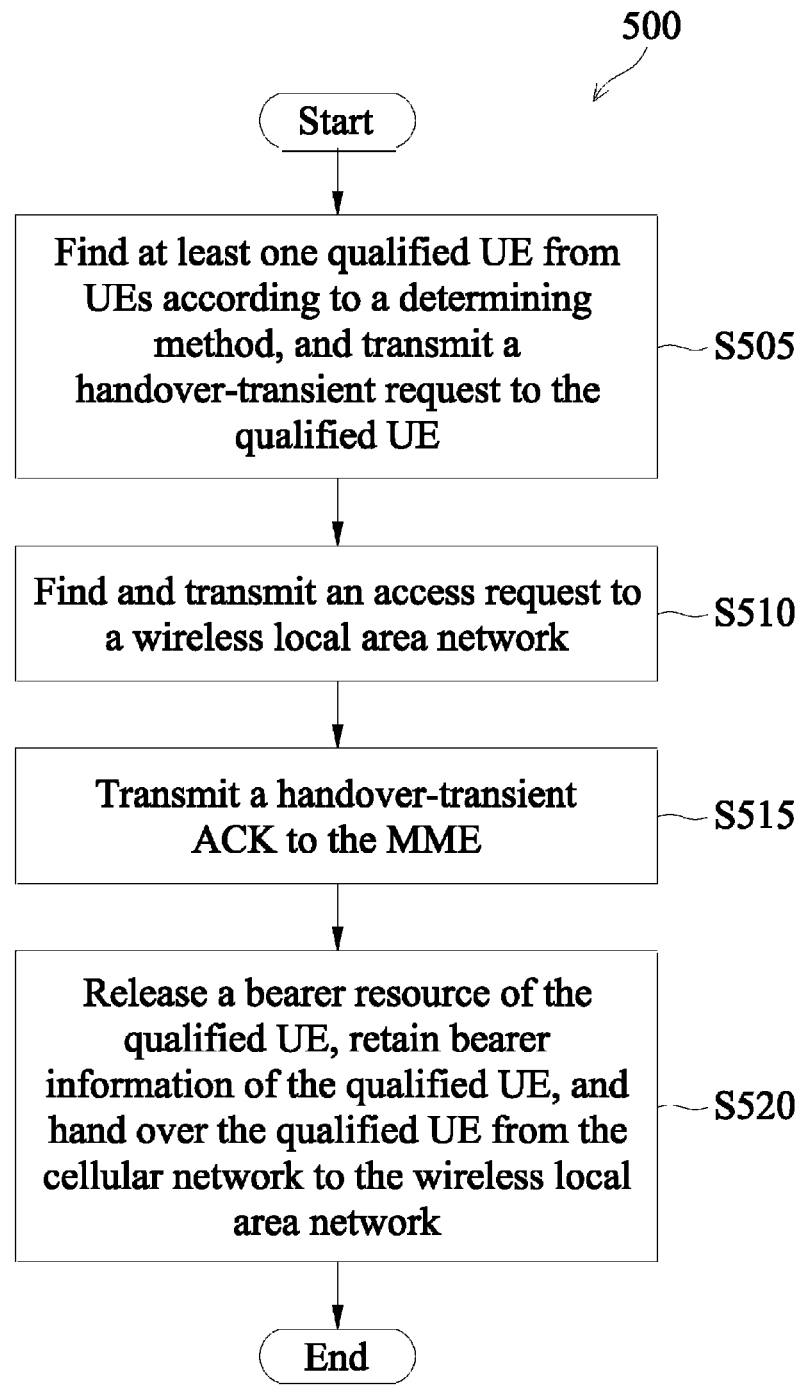
FIG. 5 is a flow diagram illustrating a method of a transient handover for performing packet offloading according to an embodiment of the present disclosure.

FIG. 5 is a flow diagram 500 illustrating a method of a transient handover for performing packet offloading according to an embodiment of the present disclosure. The method is used in a communications system, wherein the communications system is used in a cellular network. In step S505, a mobility management entity (MME) finds at least one qualified user equipment (UE) from UEs according to a determining method, and transmits a handover-transient request to the qualified UE. The determining method may be based on the network traffic load conditions. For example, the MME performs the step when the traffic load of the cellular network is overloaded. In step S510, when the qualified UE receives the handover-transient request, the qualified UE finds and transmits an access request to a wireless local area network. In step S515, when accessing the wireless local area network, the qualified UE transmits a handover-transient ACK to the MME. Finally, in step S520, when receiving the handover-transient ACK, the MME releases a bearer resource of the qualified UE, retains bearer information of the qualified UE, and hands over the qualified UE from the cellular network to the wireless local area network.

In one embodiment, the determining method is used by the MME to find the qualified UE according to one or more than one factor, wherein the factors comprises: whether the radio resource of a base station that the UEs belong to is lower than a first threshold; whether a mobility of the UEs is lower than a second threshold; whether the UEs are in a power efficient mode; and whether the traffic type of the UEs is non-real time (NRT), wherein the MME may find the qualified UE from the UEs in order according to importance of the factors. The MME may also find the qualified UE from the UEs according to the weighting factors.

In addition, the CPU 308 could execute the program code 312 to perform all of the above-described actions and steps or others described herein.

Figure 6:
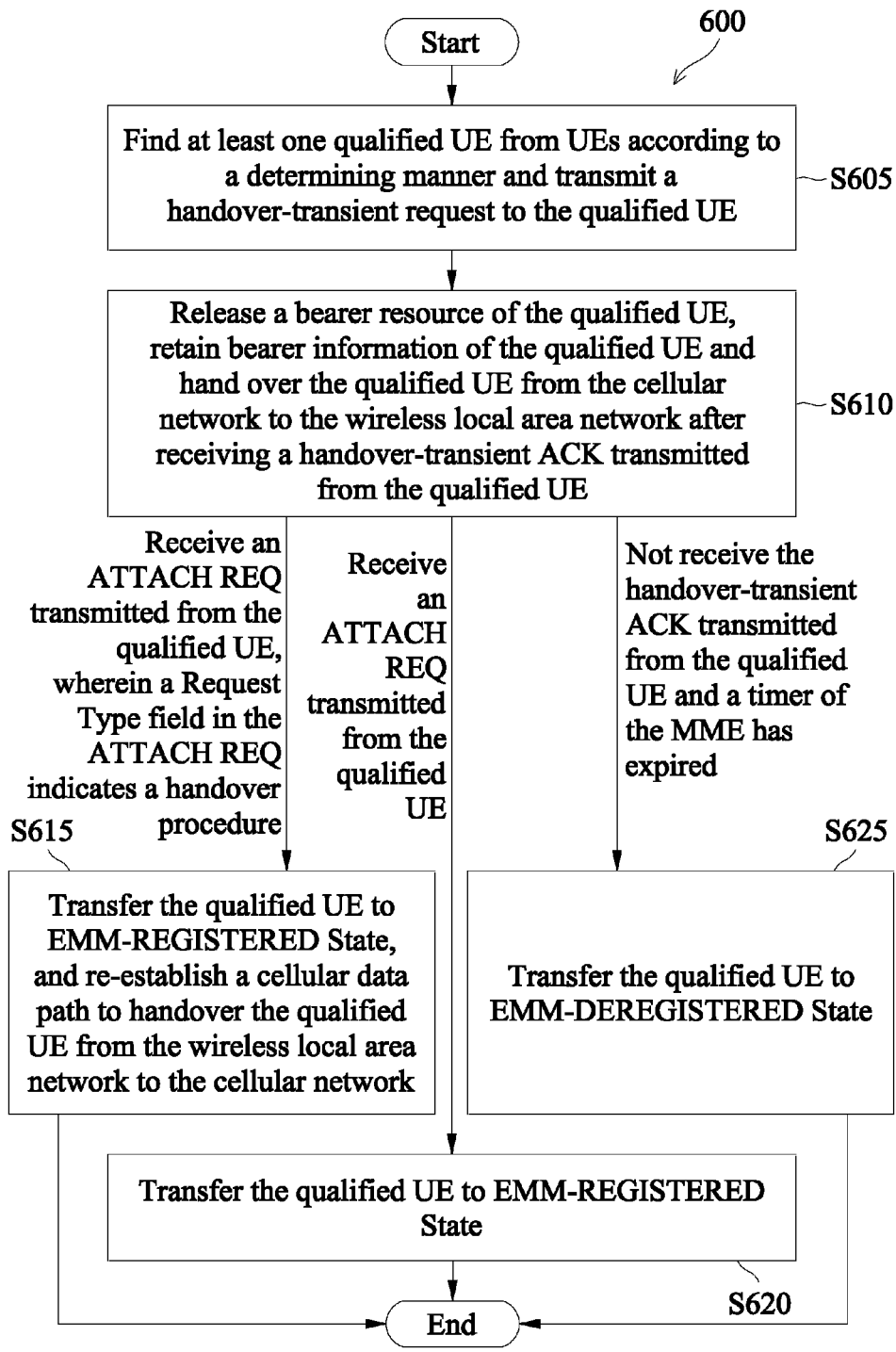
FIG. 6 is a flow diagram illustrating a method of a transient handover for performing packet offloading according to an embodiment of the present disclosure.

FIG. 6 is a flow diagram 600 illustrating a method of a transient handover for performing packet offloading according to an embodiment of the present disclosure. The method is used in the MME. In step S605, the MME finds at least one qualified UE from UEs according to a determining method and transmits a handover-transient request to the qualified UE. In step S610, the MME releases a bearer resource of the qualified UE, retains bearer information of the qualified UE and hands over the qualified UE from the cellular network to the wireless local area network after receiving a handover-transient ACK transmitted from the qualified UE. When the qualified UE is handed over from the cellular network to the wireless local area network and the MME receives an attachment request (ATTACH REQ) transmitted from the qualified UE, wherein a Request Type field in the ATTACH REQ indicates a handover procedure, in step S615, the MME transfers the qualified UE to an evolved packet system mobility management registered state (EMM-REGISTERED State), and re-establishes a cellular data path to handover the qualified UE from the wireless local area network to the cellular network. When the qualified UE is handed over from the cellular network to the wireless local area network and the MME receives the attachment request (ATTACH REQ) transmitted from the qualified UE, in step S620, the MME transfers the qualified UE to the evolved packet system mobility management registered state (EMM-REGISTERED State). When the qualified UE is handed over from the cellular network to the wireless local area network, if the MME does not receive the handover-transient ACK transmitted from the qualified UE and a timer of the MME has expired, in step S625, the MME transfers the qualified UE to an evolved packet system mobility management deregistered state (EMM-DEREGISTERED State).

Figure 7:
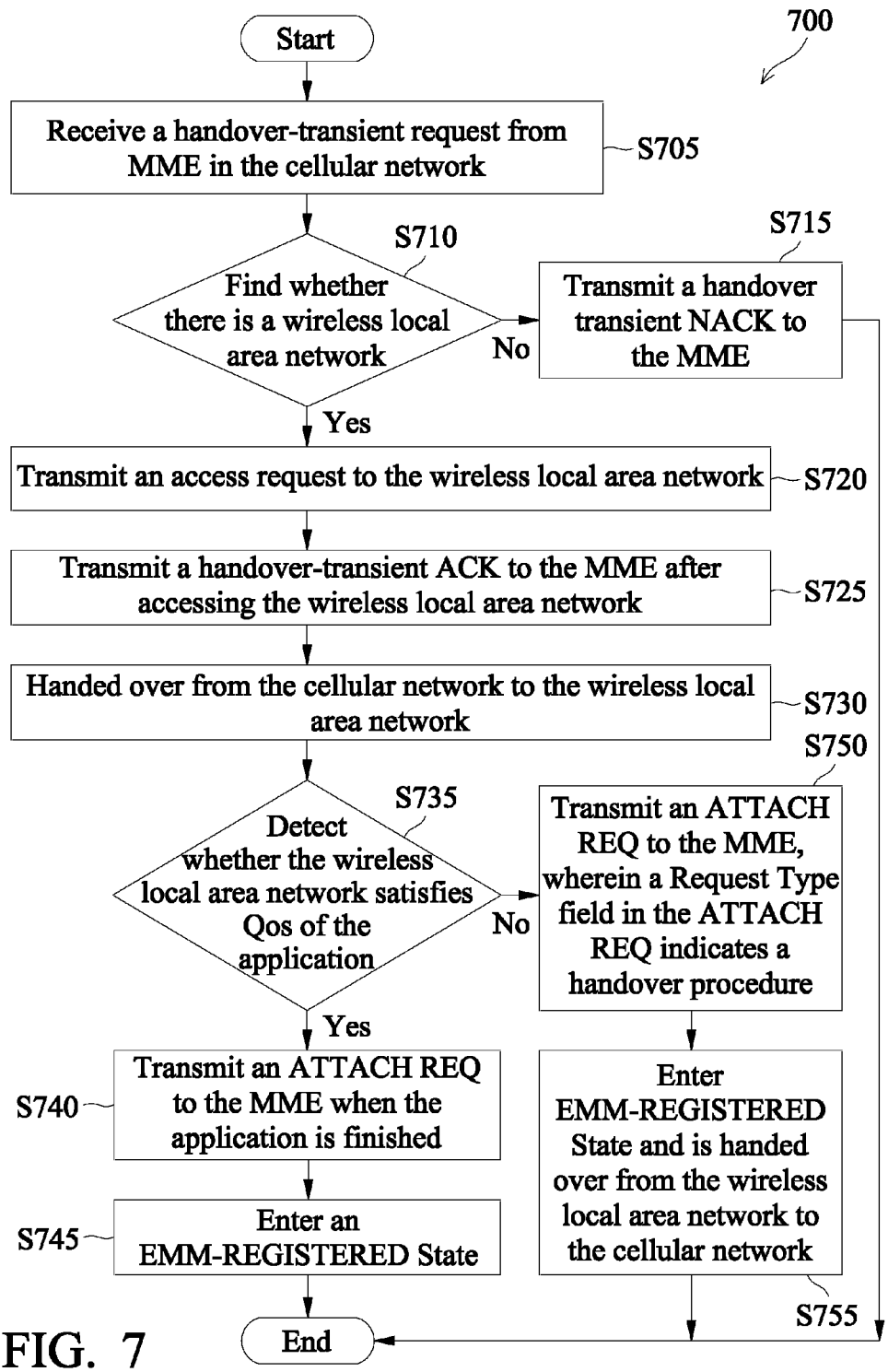
FIG. 7 is a flow diagram illustrating a method of a transient handover for performing packet offloading according to an embodiment of the present disclosure.

FIG. 7 is a flow diagram 700 illustrating a method of a transient handover for performing packet offloading according to an embodiment of the present disclosure. The method is used in the user equipment (UE) executing an application, wherein the UE attaches to a cellular network. In step S705, the UE receives a handover-transient request from a mobility management entity (MME) in the cellular network. In step S710, the UE finds whether there is a wireless local area network. When the UE does not find the wireless local area network ("No" in step S710), in step S715, the UE transmits a handover transient NACK to the MME. When the UE finds the wireless local area network ("Yes" in step S710), in step S720, the UE transmits an access request to the wireless local area network. In step S725, the UE transmits a handover-transient ACK to the MME after accessing the wireless local area network. In step S730, the UE is handed over from the cellular network to the wireless local area network by the MME. After being handed over from the cellular network to the wireless local area network, in step S735, the UE detects whether the wireless local area network satisfies quality-of-service (Qos) of the application. When determining that the wireless local area network satisfies the Qos of the application and the application is finished ("Yes" in step S735), in step S740, the UE transmits an attachment request (ATTACH REQ) to the MME. In step S745, the UE enters an evolved packet system mobility management registered state (EMM-REGISTERED State). When determining that the wireless local area network does not satisfy the Qos of the application ("No" in step S735), in step S750, the UE transmits an attachment request (ATTACH REQ) to the MME, wherein a Request Type field in the ATTACH REQ indicates a handover procedure. In step S755, the UE enters an evolved packet system mobility management registered state (EMM-REGISTERED State), and is handed over from the wireless local area network to the cellular network.

Figure 8:
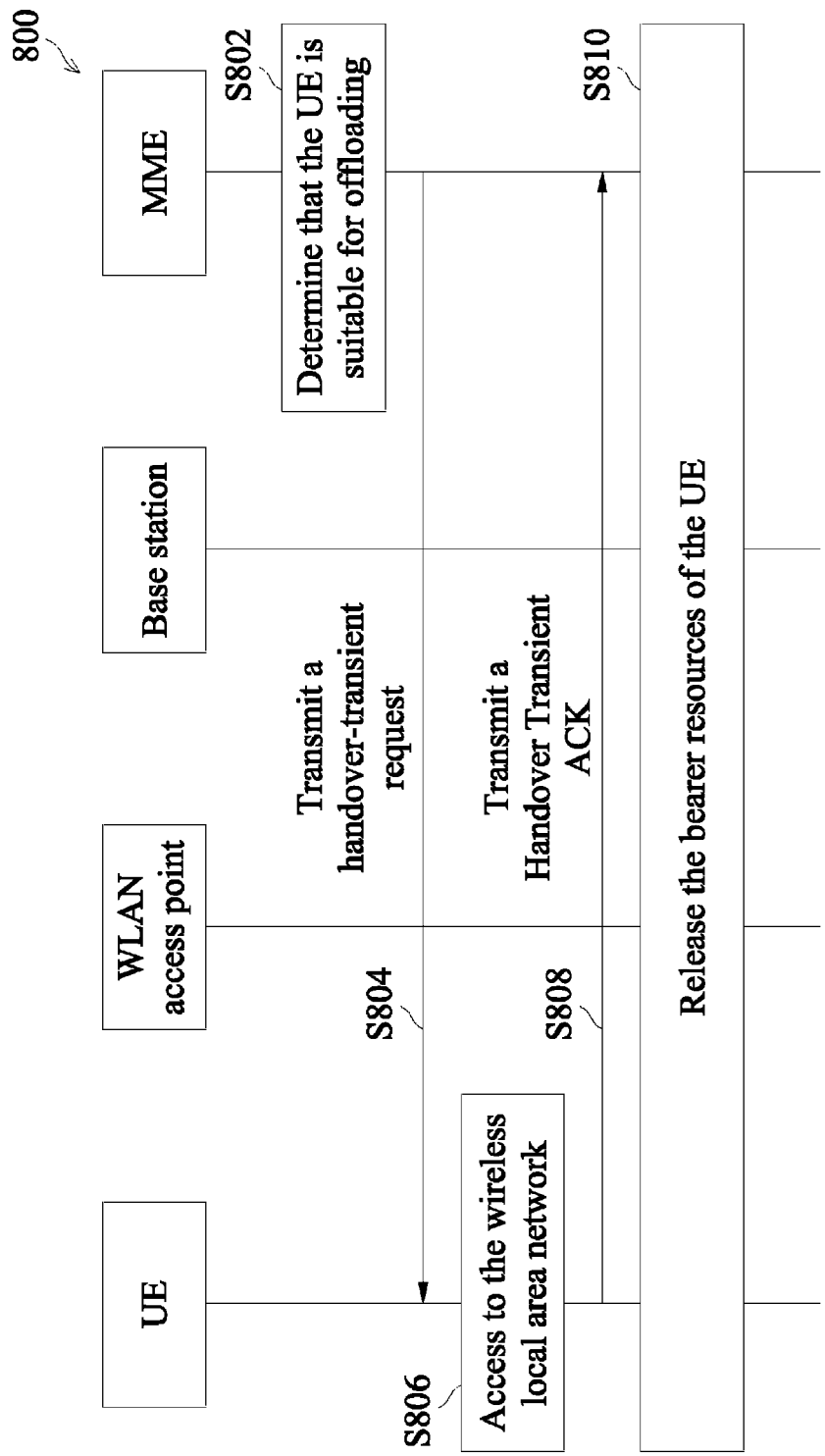
FIG. 8 is a message flow illustrating how the UE is handed over from the cellular network to the wireless local area network.

FIG. 8 is a message flow 800 illustrating how the UE is handed over from the cellular network to the wireless local area network. In step S802, the MME determines that the UE is suitable for offloading. After determining that the UE suitable for offloading, in step S804, the MME transmits a handover-transient request to the UE to start a handover-transient procedure. When the UE receives the handover-transient request, in step S806, the UE accesses to the wireless local area network. After the UE accesses the wireless local area network, in step S808, the UE transmits a handover transient acknowledgment (Handover Transient ACK) to the MME. After the MME receives the Handover Transient ACK, in step S810, the MME hands over the UE from the cellular network to the wireless local area network, and releases the bearer resources of the UE.

Figure 9:
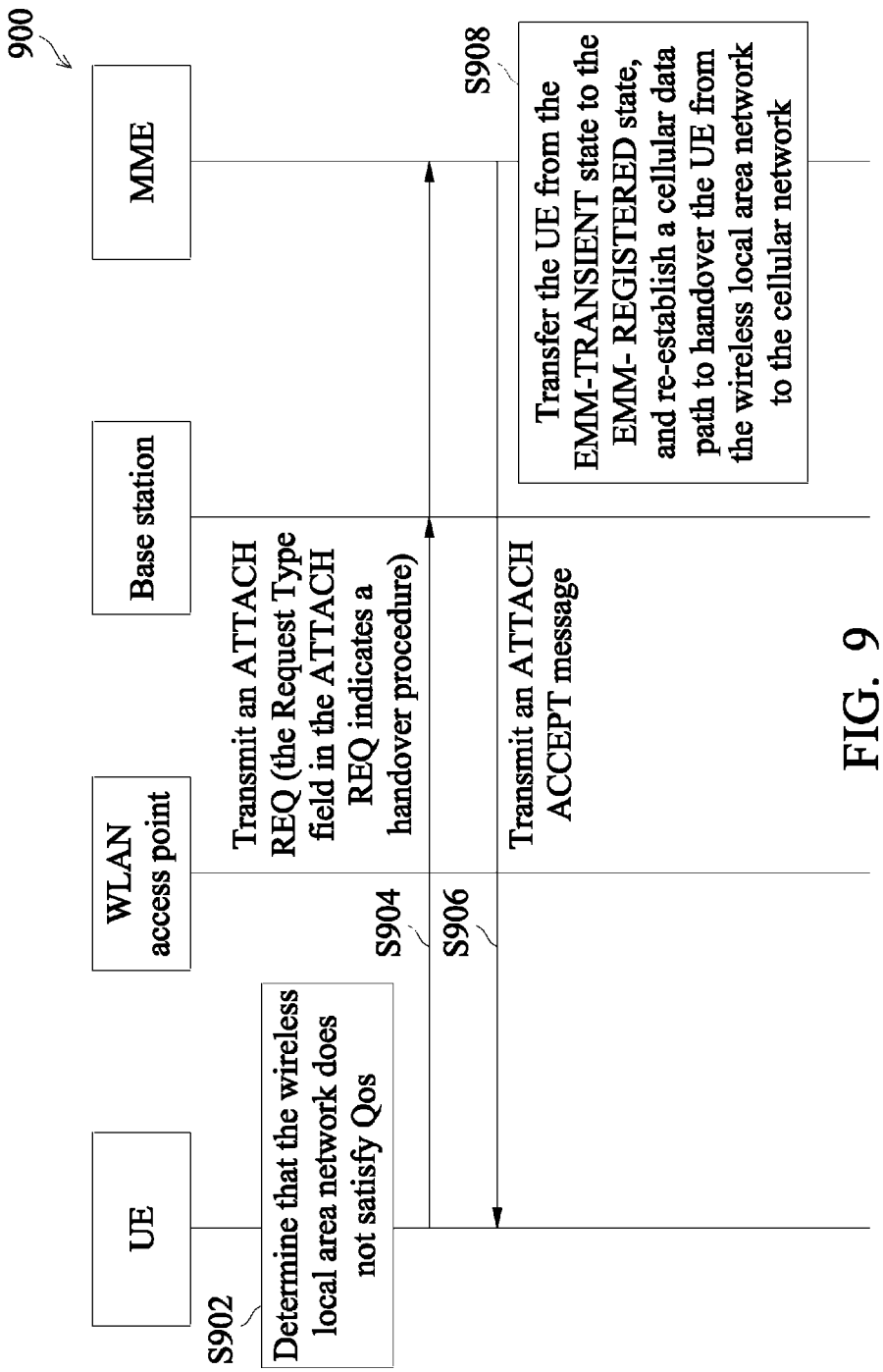
FIG. 9 is a message flow illustrating how the UE is handed over from the wireless local area network to the cellular network.

FIG. 9 is a message flow 900 illustrating how the UE is handed over from the wireless local area network to the cellular network. In step S902, the UE determines that the wireless local area network does not satisfy quality-of-service (Qos). In step S904, the UE transmits an attachment request (ATTACH REQ) to the MME through the base station to request to attach back to the cellular network, wherein the Request Type field in the ATTACH REQ indicates a handover procedure. After the MME receives the ATTACH REQ transmitted from the UE, in step S906, the MME transmits an ATTACH ACCEPT message. In step S908, the MME transfers the UE from the evolved packet system mobility management transient state (EMM-TRANSIENT State) to the evolved packet system mobility management registered state (EMM-REGISTERED State), and re-establishes a cellular data path to handover the UE from the wireless local area network to the cellular network.

Figure 10:
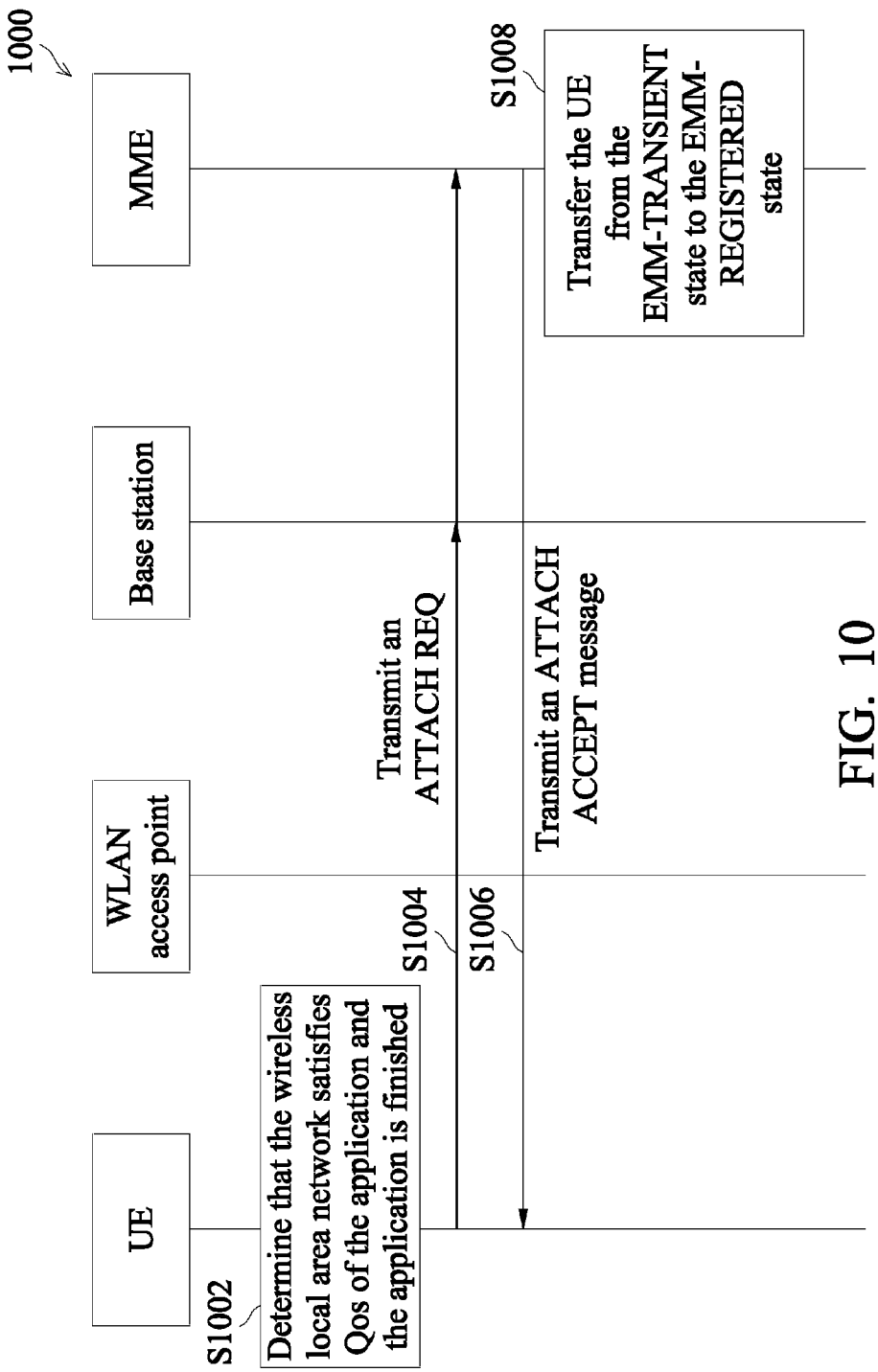
FIG. 10 is a message flow 1000 illustrating how the UE is handed over from the wireless local area network to the cellular network.

FIG. 10 is a message flow 1000 illustrating how the UE is handed over from the wireless local area network to the cellular network. In step S1002, the UE determines that the wireless local area network satisfies quality-of-service (Qos) of the application and the application is finished. In step S1004, the UE transmits an attachment request (ATTACH REQ) to the MME through the base station. After the MME receives the ATTACH REQ transmitted from the UE, in step S1006, the MME transmits an ATTACH ACCEPT message. In step S1008, the MME transfers the UE from the EMM-TRANSIENT state to the EMM-REGISTERED state.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of preferred embodiment, it is to be understood that the disclosure is not limited thereto. Those who are skilled in this technology can still make various alterations and modifications without departing from the scope and spirit of this disclosure. Therefore, the scope of the present disclosure shall be defined and protected by the following claims and their equivalents.

What is claimed is:

1. A method of a transient handover for performing packet offloading, used in a communications system, wherein the communications system is used in a cellular network, the method comprising:
   finding, by a mobility management entity (MME), at least one qualified user equipment (UE) executing an application from a plurality of user equipment (UEs) according to a determining method, and transmitting a handover-transient request to the qualified UE;
   finding and transmitting, by the qualified UE, an access request to a wireless local area network after receiving the handover-transient request;
   accessing, by the qualified UE, the wireless local area network, and transmitting a handover-transient ACK to the MME;
   releasing, by the MME, a bearer resource of the qualified UE, retaining bearer information of the qualified UE, and handing over the qualified UE from the cellular network to the wireless local area network after receiving the handover-transient ACK;
   detecting, by the qualified UE, whether the wireless local area network satisfies quality-of-service (Qos) of the application after the qualified UE is handed over from the cellular network to the wireless local area network;
   determining whether the wireless local area network satisfies the Qos of the application;
   transmitting, by the qualified UE, a first attachment request (ATTACH REQ) to the MME when determining that the wireless local area network does not satisfy the Qos of the application; and
   receiving, by the MME, the first ATTACH REQ transmitted from the qualified UE, transferring the qualified UE to an evolved packet system mobility management registered state (EMM-REGISTERED State), and re-establishing a cellular data path to handover the qualified UE from the wireless local area network to the cellular network,
   wherein the first ATTACH REQ comprises a Request Type field, and the Request Type field indicates a handover procedure.

2. The method of a transient handover for performing packet offloading as claimed in claim 1, further comprising:
   transmitting, by the qualified UE, a second attachment request (ATTACH REQ) to the MME when determining that the wireless local area network satisfies the Qos of the application and the application is finished; and
   receiving, by the MME, the second ATTACH REQ transmitted from the qualified UE and transferring the qualified UE to an evolved packet system mobility management registered state (EMM-REGISTERED State).

3. The method of a transient handover for performing packet offloading as claimed in claim 1, wherein after the qualified UE is handed over from the cellular network to the wireless local area network, further comprising:
   transferring, by the MME, the qualified UE to an evolved packet system mobility management deregistered state (EMM-DEREGISTERED State) when not receiving the handover-transient ACK transmitted from the qualified UE and a timer of the MME has expired.

4. The method of a transient handover for performing packet offloading as claimed in claim 1, wherein the bearer information at least comprises:
   a packet data network gateway identifier (P-GW ID);
   a serving gateway identifier (S-GW ID); and
   a tunnel identifier (Tunnel ID).

5. The method of a transient handover for performing packet offloading as claimed in claim 1, wherein the determining method is for finding the qualified UE according to one or more factors, the factors comprising:
   whether a radio resource of a base station that the UEs belong to is lower than a first threshold;
   whether a mobility of the UEs is lower than a second threshold;
   whether the UEs are in a power efficient mode; and
   whether a traffic type of the UEs is non-real time (NRT).

6. The method of a transient handover for performing packet offloading as claimed in claim 5, wherein the MME finds the qualified UE from the UEs in order according to importance of the one or more factors.

7. The method of a transient handover for performing packet offloading as claimed in claim 5, wherein when there are at least two factors, each factor has a respective weighting factor, and the MME finds the qualified UE from the UEs according to the weighting factors.

8. A method of a transient handover for performing packet offloading, used in a mobility management entity (MME) of a cellular network, the method comprising:
   finding at least one qualified user equipment (UE) from a plurality of user equipment (UEs) according to a determining method and transmitting a handover-transient request to the qualified UE;
   releasing a bearer resource of the qualified UE, retaining bearer information of the qualified UE, and handing over the qualified UE from a cellular network to a wireless local area network after receiving a handover-transient ACK transmitted from the qualified UE;
   receiving a first attachment request (ATTACH REQ) transmitted from the qualified UE after handing over the qualified UE from the cellular network to the wireless local area network; and
   transferring the qualified UE to an evolved packet system mobility management registered state (EMM-REGISTERED State) and re-establishing a cellular data path to handover the qualified UE from the wireless local area network to the cellular network,
   wherein the first ATTACH REQ is transmitted from the qualified UE when the qualified UE determines that the wireless local area network does not satisfy quality-of-service (Qos) of an application executed by the qualified UE, the first ATTACH REQ comprises a Request Type field, and the Request Type field indicates a handover procedure.

9. The method of a transient handover for performing packet offloading as claimed in claim 8, further comprising:
   receiving a second attachment request (ATTACH REQ) transmitted from the qualified UE after handing over the qualified UE from the cellular network to the wireless local area network; and
   transferring the qualified UE to an evolved packet system mobility management registered state (EMM-REGISTERED State) and handing over the qualified UE from the wireless local area network to the cellular network,
   wherein the second ATTACH REQ is transmitted from the qualified UE when the qualified UE determines that the wireless local area network satisfies quality-of-service (Qos) of an application executed by the UE.

10. The method of a transient handover for performing packet offloading as claimed in claim 8, wherein after the qualified UE is handed over from the cellular network to the wireless local area network, further comprising:
   transferring the qualified UE to an evolved packet system mobility management deregistered state (EMM-DEREGISTERED State) when not receiving the handover-transient ACK transmitted from the qualified UE and a timer of the MME has expired.

11. The method of a transient handover for performing packet offloading as claimed in claim 8, wherein the bearer information at least comprises:
   a packet data network gateway identifier (P-GW ID);
   a serving gateway identifier (S-GW ID); and
   a tunnel identifier (Tunnel ID).

12. The method of a transient handover for performing packet offloading as claimed in claim 8, wherein the determining method is for finding the qualified UE according to one or more factors, the factors comprising:
   whether a radio resource of a base station that the UEs belong to is lower than a first threshold;
   whether a mobility of the UEs is lower than a second threshold;
   whether the UEs are in a power efficient mode; and
   whether a traffic type of the UEs is non-real time (NRT).

13. The method of a transient handover for performing packet offloading as claimed in claim 12, wherein the MME finds the qualified UE from the UEs in order according to importance of the factors.

14. The method of a transient handover for performing packet offloading as claimed in claim 12, wherein when there are at least two factors, each factor has a weighting factor, respectively, the method further comprising:
   finding the qualified UE from the UEs according to the weighting factors.

15. A method of a transient handover for performing packet offloading, used in a user equipment (UE) executing an application, wherein the UE attaches to a cellular network, the method comprising:
   receiving a handover-transient request from a mobility management entity (MME) in the cellular network;
   finding whether there is a wireless local area network;
   transmitting an access request to the wireless local area network when finding the wireless local area network;
   transmitting a handover-transient ACK to the MME when accessing the wireless local area network;
   handed over from the cellular network to the wireless local area network by the MME;
   detecting whether the wireless local area network satisfies quality-of-service (Qos) of the application after the UE is handed over from the cellular network to the wireless local area network;
   determining whether the wireless local area network satisfies the Qos of the application;
   transmitting a first attachment request (ATTACH REQ) to the MME when determining that the wireless local area network does not satisfy the Qos of the application; and
   entering an evolved packet system mobility management registered state (EMM-REGISTERED State), and is handed over from the wireless local area network to the cellular network,
   wherein the first ATTACH REQ comprises a Request Type field, and the Request Type field indicates a handover procedure.

16. The method of a transient handover for performing packet offloading as claimed in claim 15, further comprising:
   transmitting a second attachment request (ATTACH REQ) to the MME when determining that the wireless local area network satisfies the Qos of the application and the application is finished; and
   entering an evolved packet system mobility management registered state (EMM-REGISTERED State).

17. The method of a transient handover for performing packet offloading as claimed in claim 15, further comprising:
   transmitting a handover transient NACK to the MME when not finding the wireless local area network.

18. A communications system of a transient handover for performing packet offloading, used in a cellular network, comprising:
   at least one qualified user equipment (UE), attaching to the cellular network and executing an application; and a mobility management entity (MME), coupled to the qualified UE, configured to find the qualified UE from UEs according to a determining method, and transmit a handover-transient request to the qualified UE, wherein the qualified UE finds and transmits an access request to a wireless local area network after receiving the handover-transient request; the qualified UE transmits a handover-transient ACK to the MME when accessing the wireless local area network; the MME releases a bearer resource of the qualified UE, retains bearer information of the qualified UE and hands over the qualified UE from the cellular network to the wireless local area network after receiving the handover-transient ACK;

wherein the qualified UE detects whether the wireless local area network satisfies quality-of-service (Qos) of the application after the qualified UE is handed over from the cellular network to the wireless local area network; the qualified UE determines whether the wireless local area network satisfies the Qos of the application, and transmits a first attachment request (ATTACH REQ) to the MME when determining that the wireless local area network does not satisfy the Qos of the application; the MME receives the first ATTACH REQ transmitted from the qualified UE, transferring the qualified UE to an evolved packet system mobility management registered state (EMM-REGISTERED State), and re-establishes a cellular data path to handover the qualified UE from the wireless local area network to the cellular network, wherein the first ATTACH REQ comprises a Request Type field, and the Request Type field indicates a handover procedure.

19. The communications system of a transient handover for performing packet offloading as claimed in claim 18, wherein the qualified UE transmits a second attachment request (ATTACH REQ) to the MME when determining that the wireless local area network satisfies the Qos of the application and the application is finished; and the MME receives the second ATTACH REQ transmitted from the qualified UE and transfers the qualified UE to an evolved packet system mobility management registered state (EMM-REGISTERED State).

20. The communications system of a transient handover for performing packet offloading as claimed in claim 18, further comprising:

a timer, wherein after the qualified UE is handed over from the cellular network to the wireless local area network, the MME transfers the qualified UE to an evolved packet system mobility management deregistered state (EMM-DEREGISTERED State) when not receiving the handover-transient ACK transmitted from the qualified UE and the timer has expired.

21. The communications system of a transient handover for performing packet offloading as claimed in claim 18, wherein the bearer information at least comprises:

a packet data network gateway identifier (P-GW ID);
a serving gateway identifier (S-GW ID); and
a tunnel identifier (Tunnel ID).

22. The communications system of a transient handover for performing packet offloading as claimed in claim 18, wherein the determining method is for finding the qualified UE according to one or more factors, the factors comprising:

whether a radio resource of a base station that the UEs belongs to is lower than a first threshold;

whether a mobility of the UEs is lower than a second threshold;

whether the UEs are in a power efficient mode; and whether a traffic type of the UEs is non-real time (NRT).

23. The communications system of a transient handover for performing packet offloading as claimed in claim 22, wherein the MME finds the qualified UE from the UEs in order according to importance of the one or more factors.

24. The communications system of a transient handover for performing packet offloading as claimed in claim 22, wherein when there are at least two factors, each factor has a weighting factor, respectively, and the MME find the qualified UE from the UEs according to the weighting factor.

25. A mobility management entity (MME), used in a cellular network, at least comprising:

a control circuit;

a processor installed in the control circuit;

a memory installed in the control circuit and coupled to the processor;

wherein the processor is configured to execute a program code stored in memory to execute a transient handover for performing packet offloading by:

finding at least one qualified user equipment (UE) from a plurality of user equipment (UEs) according to a determining method and transmitting a handover-transient request to the qualified UE; and releasing a bearer resource of the qualified UE, retaining bearer information of the qualified UE, and handing over the qualified UE from the cellular network to a wireless local area network after receiving a handover-transient ACK transmitted from the qualified UE, wherein after handing over the qualified UE from the cellular network to the wireless local area network, the processor further executes:

transferring the qualified UE to an evolved packet system mobility management registered state (EMM-REGISTERED State) when the MME receives a first attachment request (ATTACH REQ) transmitted from the qualified UE, and re-establishing a cellular data path to handover the qualified UE from the wireless local area network to the cellular network, wherein the first ATTACH REQ is transmitted from the qualified UE when the qualified UE determines that the wireless local area network does not satisfy quality-of-service (Qos) of an application executed by the qualified UE, the first ATTACH REQ comprises a Request Type field, and the Request Type field indicates a handover procedure.

26. The mobility management entity as claimed in claim 25, wherein after handing over the qualified UE from the cellular network to the wireless local area network, the processor further executes:

receiving a second attachment request (ATTACH REQ) transmitted from the qualified UE after handing over the qualified UE from the cellular network to the wireless local area network;

transferring the qualified UE to an evolved packet system mobility management registered state (EMM-REGISTERED State) and handing over the qualified UE from the wireless local area network to the cellular network; and re-establishes a cellular data path to handover the qualified UE from the wireless local area network to the cellular network, wherein the second ATTACH REQ is transmitted from the qualified UE when the qualified UE determines that the wireless local area network satisfies quality-of-service (Qos) of an application executed by the UE.

27. The mobility management entity as claimed in claim 25, further comprising:
a timer,
wherein after handing over the qualified UE from the cellular network to the wireless local area network, transferring the qualified UE to an evolved packet system mobility management deregistered state (EMM-DEREGISTERED State) when the MME does not receive the handover-transient ACK transmitted from the qualified UE and the timer has expired.

28. The mobility management entity as claimed in claim 25, wherein the bearer information at least comprises:
a packet data network gateway identifier (P-GW ID);
a serving gateway identifier (S-GW ID); and
a tunnel identifier (Tunnel ID).

29. The mobility management entity as claimed in claim 25, wherein the determining method is for finding the qualified UE according to one or more factors, the factors comprising:
whether a radio resource of a base station that the UEs belong to is lower than a first threshold;
whether a mobility of the UEs is lower than a second threshold;
whether the UEs are in a power efficient mode; and
whether a traffic type of the UEs is non-real time (NRT).

30. The mobility management entity as claimed in claim 29, wherein the MME finds the qualified UE from the UEs in order according to importance of the one or more factors.

31. The mobility management entity as claimed in claim 29, wherein when there are at least two factors, each factor has a weighting factor, respectively, and the MME finds the qualified UE from the UEs according to the weighting factor.

32. A user equipment (UE), used to execute an application and attached to a cellular network, comprising:
a control circuit;
a processor installed in the control circuit;
a memory installed in the control circuit and coupled to the processor;
wherein the processor is configured to execute a program code stored in memory to execute a transient handover for performing packet offloading by:
receiving a handover-transient request from a mobility management entity (MME) in the cellular network;
finding whether there is a wireless local area network;
transmitting an access request to the wireless local area network when finding the wireless local area network;
transmitting a handover-transient ACK to the MME when accessing the wireless local area network;
handing over from the cellular network to the wireless local area network by the MME;
detecting whether the wireless local area network satisfies quality-of-service (Qos) of the application after the UE is handed over from the cellular network to the wireless local area network;
determining whether the wireless local area network satisfies the Qos of the application;
transmitting a first attachment request (ATTACH REQ) to the MME when determining that the wireless local area network does not satisfy the Qos of the application; and
entering an evolved packet system mobility management registered state (EMM-REGISTERED State), and is handed over from the wireless local area network to the cellular network,
wherein the first ATTACH REQ comprises a Request Type field, and the Request Type field indicates a handover procedure.

33. The user equipment as claimed in claim 32, further comprising:
transmitting a second attachment request (ATTACH REQ) to the MME when determining that the wireless local area network satisfies the Qos of the application and the application is finished; and
entering an evolved packet system mobility management registered state (EMM-REGISTERED State).

34. The user equipment as claimed in claim 32, further comprising:
transmitting a handover transient NACK to the MME when not finding the wireless local area network.

* * * * *